(12) United States Patent
Balmakhtar (10) Patent No.: US 12,549,941 B2
(45) Date of Patent: Feb. 10, 2026

(54) SECURE TUNNEL AS A SERVICE FOR 5G NETWORKS

(71) Applicant: T-Mobile USA, Inc., Bellevue, WA (US)

(72) Inventor: Marouane Balmakhtar, Alexandria, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 212 days.

(21) Appl. No.: 18/073,411

(22) Filed: Dec. 1, 2022

(65) Prior Publication Data

US 2024/0187846 A1   Jun. 6, 2024

(51) Int. Cl.
*H04W 12/043* (2021.01)
*H04W 12/03* (2021.01)

(52) U.S. Cl.
CPC ......... *H04W 12/03* (2021.01); *H04W 12/043* (2021.01)

(58) Field of Classification Search
CPC ............................ H04W 12/03; H04W 12/043
See application file for complete search history.

(56) References Cited

U.S. PATENT DOCUMENTS

| 7,155,526 | B2 | 12/2006 | Chaudhary et al. |
| 8,331,384 | B2 | 12/2012 | Ghai |
| 8,345,604 | B2 | 1/2013 | Balasubramanian et al. |
| 8,559,337 | B2 | 10/2013 | Xie et al. |
| 9,510,376 | B2 | 11/2016 | Wang et al. |
| 9,843,975 | B2 | 12/2017 | Roeland et al. |
| 10,292,040 | B2 | 5/2019 | Dubesset et al. |
| 10,455,536 | B1 | 10/2019 | Khawand et al. |
| 10,477,383 | B2 | 11/2019 | Namiranian |

(Continued)

FOREIGN PATENT DOCUMENTS

| CN | 102457834 B | 1/2016 |
| CN | 110312252 A | 10/2019 |

(Continued)

OTHER PUBLICATIONS

European Patent Office, Extended European Search Report, EP Patent Application 21176552.4, mailed Oct. 22, 2021, 6 pages.

*Primary Examiner* — Lynn D Feild
*Assistant Examiner* — Abdullah Almamun
(74) *Attorney, Agent, or Firm* — Perkins Coie LLP (57) ABSTRACT

An apparatus establishes a secure tunnel within a non-3GPP network to connect to a 5G core network (5GCN) via a non-3GPP Interworking Function (N3IWF) service of the 5GCN. The apparatus lacks subscriber identity module (SIM) capability and eSIM capability. The non-3GPP network connects to the 5GCN using a backhaul network that lacks a radio access network (RAN). The apparatus includes a connectivity stack that configures the apparatus to establish the secure tunnel. The connectivity stack includes a control plane layer and a user plane layer. The apparatus sends a registration request to the 5GCN via the established secure tunnel. The apparatus performs a security handshake with the 5GCN via the N3IWF service. The security handshake includes an exchange of security parameters between the apparatus and the N3IWF service. The apparatus receives a message indicating that registration of the apparatus with the 5GCN over the non-3GPP network is complete.

19 Claims, 6 Drawing Sheets (56) References Cited

U.S. PATENT DOCUMENTS

| | | |
|---|---|---|
| 10,536,840 B2 | 1/2020 | Lipovkov |
| 10,652,728 B1 | 5/2020 | Guday et al. |
| 10,659,954 B2 | 5/2020 | Hamblet |
| 10,674,346 B2 | 6/2020 | Faccin et al. |
| 10,826,945 B1 | 11/2020 | Xu et al. |
| 10,827,344 B2 | 11/2020 | Gupta |
| 10,848,961 B1 | 11/2020 | Larsson et al. |
| 10,911,945 B1 | 2/2021 | Youngs |
| 10,939,268 B1 | 3/2021 | Roy et al. |
| 10,958,618 B2 | 3/2021 | Xu et al. |
| 10,966,269 B2 | 3/2021 | Keller et al. |
| 10,984,128 B1 | 4/2021 | Hoffer |
| 10,993,096 B1 | 4/2021 | Williams et al. |
| 10,999,888 B2 | 5/2021 | Kang et al. |
| 11,109,220 B1 | 8/2021 | Shah et al. |
| 11,223,940 B2 | 1/2022 | Schmidt et al. |
| 11,362,955 B2 | 6/2022 | Chin et al. |
| 11,477,701 B2 | 10/2022 | Tsai et al. |
| 11,889,298 B2* | 1/2024 | Foti ............... H04L 61/4511 |
| 2006/0072531 A1* | 4/2006 | Ewing .............. H04L 69/08 |
| | | 455/445 |
| 2009/0007091 A1 | 1/2009 | Appiah et al. |
| 2012/0108204 A1 | 5/2012 | Schell et al. |
| 2015/0281964 A1 | 10/2015 | Seo et al. |
| 2016/0020802 A1 | 1/2016 | Lee et al. |
| 2016/0020803 A1 | 1/2016 | Cha et al. |
| 2016/0020804 A1 | 1/2016 | Lee et al. |
| 2016/0192186 A1* | 6/2016 | Lin .................. H04L 63/061 |
| | | 380/270 |
| 2016/0352917 A1 | 12/2016 | Pieda et al. |
| 2017/0033823 A1 | 2/2017 | Smith et al. |
| 2017/0048713 A1 | 2/2017 | Guday et al. |
| 2017/0064552 A1 | 3/2017 | Park et al. |
| 2017/0142121 A1 | 5/2017 | Lee et al. |
| 2017/0208039 A1* | 7/2017 | Godfrey ............... G06F 9/00 |
| 2017/0289788 A1 | 10/2017 | Lalwaney |
| 2017/0289883 A1 | 10/2017 | Kiss et al. |
| 2017/0338944 A1 | 11/2017 | Yang et al. |
| 2017/0338954 A1 | 11/2017 | Yang et al. |
| 2018/0014339 A1 | 1/2018 | Baek et al. |
| 2018/0070224 A1 | 3/2018 | Park et al. |
| 2018/0109676 A1 | 4/2018 | Yeoum et al. |
| 2018/0146364 A1 | 5/2018 | Coureau et al. |
| 2018/0167983 A1* | 6/2018 | Salkintzis ........... H04W 76/15 |
| 2019/0037335 A1 | 1/2019 | Steck |
| 2019/0069122 A1 | 2/2019 | Karimli et al. |
| 2019/0075453 A1 | 3/2019 | Yoon et al. |
| 2019/0098488 A1 | 3/2019 | Syed et al. |
| 2019/0140837 A1 | 5/2019 | Cheng et al. |
| 2019/0230087 A1 | 7/2019 | Gharout et al. |
| 2019/0289454 A1 | 9/2019 | Inoue |
| 2019/0324735 A1 | 10/2019 | Park |
| 2019/0335330 A1* | 10/2019 | Salkintzis ........... H04W 12/72 |
| 2019/0364415 A1 | 11/2019 | Gao et al. |
| 2019/0373448 A1 | 12/2019 | Gao |
| 2020/0015069 A1 | 1/2020 | Anslot et al. |
| 2020/0021975 A1 | 1/2020 | Schouler |
| 2020/0092711 A1 | 3/2020 | Chen et al. |
| 2020/0134638 A1* | 4/2020 | Beaver ............... G06Q 30/016 |
| 2020/0137558 A1 | 4/2020 | Chaugule et al. |
| 2020/0236546 A1 | 7/2020 | Yu et al. |
| 2020/0280843 A1* | 9/2020 | Foti ................. H04W 88/16 |
| 2020/0288300 A1 | 9/2020 | Oswal et al. |
| 2020/0314638 A1 | 10/2020 | Veneroso |
| 2021/0037060 A1* | 2/2021 | Robison ............ H04L 63/123 |
| 2021/0058748 A1 | 2/2021 | Liao |
| 2021/0110057 A1* | 4/2021 | Lamba ............. G06F 21/6245 |
| 2021/0136582 A1 | 5/2021 | Liu |
| 2021/0306849 A1* | 9/2021 | Liu ................... H04W 60/00 |
| 2021/0385192 A1 | 12/2021 | Zhang et al. |
| 2022/0060880 A1 | 2/2022 | Niemi et al. |
| 2022/0078872 A1 | 3/2022 | Shrestha et al. |
| 2022/0086622 A1 | 3/2022 | Laina Farell et al. |
| 2022/0141652 A1 | 5/2022 | Shah et al. |
| 2022/0232366 A1 | 7/2022 | Seo |
| 2022/0232385 A1 | 7/2022 | Seo |
| 2022/0232388 A1 | 7/2022 | Seo et al. |
| 2022/0248361 A1 | 8/2022 | Long |
| 2022/0329446 A1* | 10/2022 | Jackson .............. H04L 9/3247 |
| 2022/0345949 A1 | 10/2022 | Youn et al. |
| 2023/0021912 A1* | 1/2023 | Jain ................ H04W 28/0226 |
| 2023/0413060 A1* | 12/2023 | Baskaran ........... H04L 63/0823 |
| 2024/0007848 A1 | 1/2024 | Chaugule et al. |
| 2024/0031811 A1* | 1/2024 | Mohebbi ............ H04W 12/72 |
| 2024/0107303 A1* | 3/2024 | Pattnaik .............. H04W 12/02 |
| 2025/0097691 A1 | 3/2025 | Gupta |

FOREIGN PATENT DOCUMENTS

| | | |
|---|---|---|
| CN | 111183670 A | 5/2020 |
| CN | 111328455 A | 6/2020 |
| CN | 106411676 B | 7/2020 |
| CN | 107257539 B | 10/2020 |
| CN | 111758246 A | 10/2020 |
| CN | 112602298 A | 4/2021 |
| CN | 112954629 A | 6/2021 |
| CN | 108810123 B | 9/2021 |
| CN | 113852951 A | 12/2021 |
| CN | 110830996 B | 4/2022 |
| EP | 1938518 A1 | 7/2008 |
| EP | 3170301 A1 | 5/2017 |
| EP | 3277000 A1 | 1/2018 |
| EP | 3402238 A1 | 11/2018 |
| EP | 3277001 B1 | 1/2019 |
| EP | 3335448 B1 | 9/2019 |
| EP | 3643092 A1 | 4/2020 |
| EP | 3672300 A1 | 6/2020 |
| EP | 3681183 A2 | 7/2020 |
| EP | 3714615 A1 | 9/2020 |
| EP | 3777273 A1 | 2/2021 |
| EP | 3644631 B1 | 6/2021 |
| EP | 3923645 A1 | 12/2021 |
| EP | 3437373 B1 | 7/2022 |
| EP | 3721649 B1 | 10/2022 |
| JP | 5925918 B2 | 4/2016 |
| JP | 2016167835 A | 9/2016 |
| JP | 6513539 B2 | 4/2019 |
| JP | WO2019065897 A1 | 8/2020 |
| JP | 2021002793 A | 1/2021 |
| JP | 2021182676 A | 11/2021 |
| KR | 20110081938 A | 7/2011 |
| KR | 101268579 B1 | 5/2013 |
| KR | 101447766 B1 | 10/2014 |
| KR | 101500803 B1 | 3/2015 |
| KR | 101535361 B1 | 7/2015 |
| KR | 102293706 B1 | 8/2021 |
| KR | 20210101658 A | 8/2021 |
| KR | 20210101667 A | 8/2021 |
| KR | 102378301 B1 | 3/2022 |
| KR | 102399737 B1 | 5/2022 |
| KR | 20220097461 A | 7/2022 |
| KR | 102435266 B1 | 8/2022 |
| WO | 2008009227 A1 | 1/2008 |
| WO | 2013023515 A1 | 2/2013 |
| WO | 2017201804 A1 | 11/2017 |
| WO | 2018053903 A1 | 3/2018 |
| WO | 2018065052 A1 | 4/2018 |
| WO | 2018067956 A1 | 4/2018 |
| WO | 2018133271 A1 | 7/2018 |
| WO | 2019018244 A1 | 1/2019 |
| WO | 2019136044 A1 | 7/2019 |
| WO | 2020187261 A1 | 9/2020 |
| WO | 2020253801 A1 | 12/2020 |
| WO | 2021008713 A1 | 1/2021 |
| WO | 2021047561 A1 | 3/2021 |
| WO | 2021057648 A1 | 4/2021 |
| WO | 2021058305 A1 | 4/2021 |
| WO | 2021138511 A1 | 7/2021 |
| WO | 2021160272 A1 | 8/2021 |
| WO | 2021162387 A1 | 8/2021 |
| WO | 2021233159 A1 | 11/2021 |
| WO | 2022001554 A1 | 1/2022 |

(56) References Cited

FOREIGN PATENT DOCUMENTS

WO           2022139481 A1     6/2022
WO    WO-2022207164 A1 * 10/2022   ........... H04L 63/06

* cited by examiner

SECURE TUNNEL AS A SERVICE FOR 5G NETWORKS

BACKGROUND

Wireless communication networks provide wireless data services to user devices. Exemplary wireless data services include Internet access, media streaming, social networking, and machine control. Wireless user devices execute user applications to support and use the wireless data services. For example, a phone may execute an internet access application that to communicate with a data network.

Wireless communication networks have wireless access nodes, which exchange wireless signals with wireless user devices over radio frequency bands. Wireless signals use wireless network protocols, such as Fifth-Generation New Radio (5GNR), Long Term Evolution (LTE), IEEE 802.11 (WI-FI), IEEE 802.3 (ENET), and Low-Power Wide Area Network (LP-WAN). Wireless access nodes exchange network signaling and user data with network elements that are often clustered together into wireless network cores. Network elements can include Non-Third Generation Partnership Project Interworking Functions (N3IWFs), Access and Mobility Management Functions (AMFs), Session Management Functions (SMFs), User Plane Functions (UPFs), Policy Control Functions (PCFs), Network Exposure Functions (NEFs), Application Functions (AFs), and the like.

Some wireless user devices include 3GPP devices that communicate with wireless network cores over wireless access nodes using 3GPP protocols (e.g., 5GNR and LTE) and non-3GPP protocols (e.g., WI-FI and ENET). Other wireless user devices include non-3GPP-only devices that communicate with wireless network cores over wireless access nodes using non-3GPP protocols, such as WI-FI and ENET. 3GPP user equipment (UE) can be limited to two N1 signaling links with a wireless network core: a 3GPP link and a non-3GPP link. 3GPP UEs are typically unable to establish multiple N1 links over the same type of protocol. Non-3GPP UEs are also typically unable to establish multiple N1 links. Thus, non-3GPP UEs cannot effectively or efficiently attach to wireless network cores. Similarly, non-3GPP UEs are typically unable to access network core services that are restricted to 3GPP UEs.

Moreover, as 5G networks evolve, lightweight mobile devices may not support a subscriber identity module (SIM)-based enclave. For example, it is estimated that by 2025, North America alone could have 3.4 billion device connections that may not be SIM-capable. Traditional security approaches, such as VPN-based methods to connect to the Internet may not be sufficient. Furthermore, conventional security gateways deployed on premise by a wireless operator would only service devices that connect to the core network of that wireless operator, thus limiting connectivity and useability.

BRIEF DESCRIPTION OF THE DRAWINGS

Detailed descriptions of implementations of the present technology will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional 5G specifications enable devices to connect to cellular networks using trusted non-3GPP Internet protocol (IP) access networks or untrusted non-3GPP IP access networks using a non-3GPP interworking function (N3IWF). The 5G core network (5GCN) has therefore emerged as the consolidated service platform of the future. The latest 3GPP standards are intended to support a broader range of devices, for example, Internet of things (IoT) devices, applications, and connections using 5G (e.g., to converge wireline and wireless networks). However, deployment of such connectivity is typically functionality-limited by design in the 3GPP standards. For example, numerous IoT and other devices, such as laptops and tablets lack subscriber identity module (SIM) cards and eSIM functionality. Such devices cannot connect to the 5GCN, by design, to access network services. However, these devices can connect to non-3GPP networks, for example, W-Fi, Bluetooth, and other wireless and wireline networks. Secure mechanisms to connect these devices to the 5GCN are therefore needed to access 5G network services.

This specification discloses apparatuses, methods, and systems for implementing a universal 3GPP-based secure tunnel-as-a-service for 5G networks. In some implementations, an enhanced non-3GPP access network security service is provided that consolidates N3IWF functionality in a cloud-native manner. The implementations disclosed enable emerging services that require different methods of accessing the 5G core network (5GCN) to connect to newly-offered security offerings, such as network slicing, providing segregated security and performance. The disclosed methods provide a unified security framework for operating a data communication system to serve user equipments (UEs) via a secure tunnel that enables, for example, security features, such as IP traffic inspection and prevents distributed denial-of-service (DDOS) attacks.

A device that lacks SIM capability and eSIM capability can be designed to connect to the 5GCN. The device can establish a secure tunnel within a non-3GPP network to connect to the 5GCN. For example, the secure tunnel is terminated at a non-3GPP Interworking Function (N3IWF) service of the 5G network. The device can include a connectivity stack that configures the device to establish the secure tunnel. A network node, such as a gateway, can also include a similar connectivity stack that configures a secure tunnel to the 5G network for devices that have no connectivity stack.

The connectivity stack can include a control plane layer or a user plane layer. To connect to the 5GCN, the device sends a registration request to the 5GCN via the established secure tunnel. For registration, the device performs a security handshake with the 5GCN via the N3IWF service. For example, the security handshake includes an exchange of security parameters between the device and the N3IWF service. After the security handshake, the device receives a message indicating that registration of the apparatus with the 5GCN over the non-3GPP network is complete. The device can now send and receive data packets to and from the 5GCN via the secure tunnel to access 5G network services.

The benefits and advantages of the implementations described herein include useful solutions to connect mobile devices that are not SIM- or eSIM-capable to multiple 5G Core Networks (5GCN) that belong the same or different wireless operators using security credentials that are not SIM nor eSIM based. The implementations described provide mechanisms to connect non-SIM based devices to other SG core networks in a cloud-native manner. Further, the disclosed methods enable security services for non-3GPP devices and other applications beyond traditional limited-authentication mechanisms, such as EAP-AKA for 4G or EAP-AKA' for 5G, that are SIM specific for which N3IWF is deployed on premise. Moreover, the disclosed systems improve the overall security posture for non-3GPP devices.

Further benefits and advantages of the implementations described herein include the attachment of devices using either Untrusted Non-3GPP Access Networks, Trusted Non-3GPP Access Networks, or Wireline Access Networks. For example, device connectivity to the 5G core is enabled through an enhanced non-3GPP Access Network layer. Thus, wireless operators can increase service revenue by exploiting wireline and wireless connectivity. Devices without RAN access and without SIM cards can connect to the 5G core network, thus increasing the addressable wireless operator service market. Moreover, disclosed apparatuses enable loT devices, tablets, laptops, or computers to connect without radios and benefit from the SG core network. Devices having radios can benefit from enhanced services through dual connectivity.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
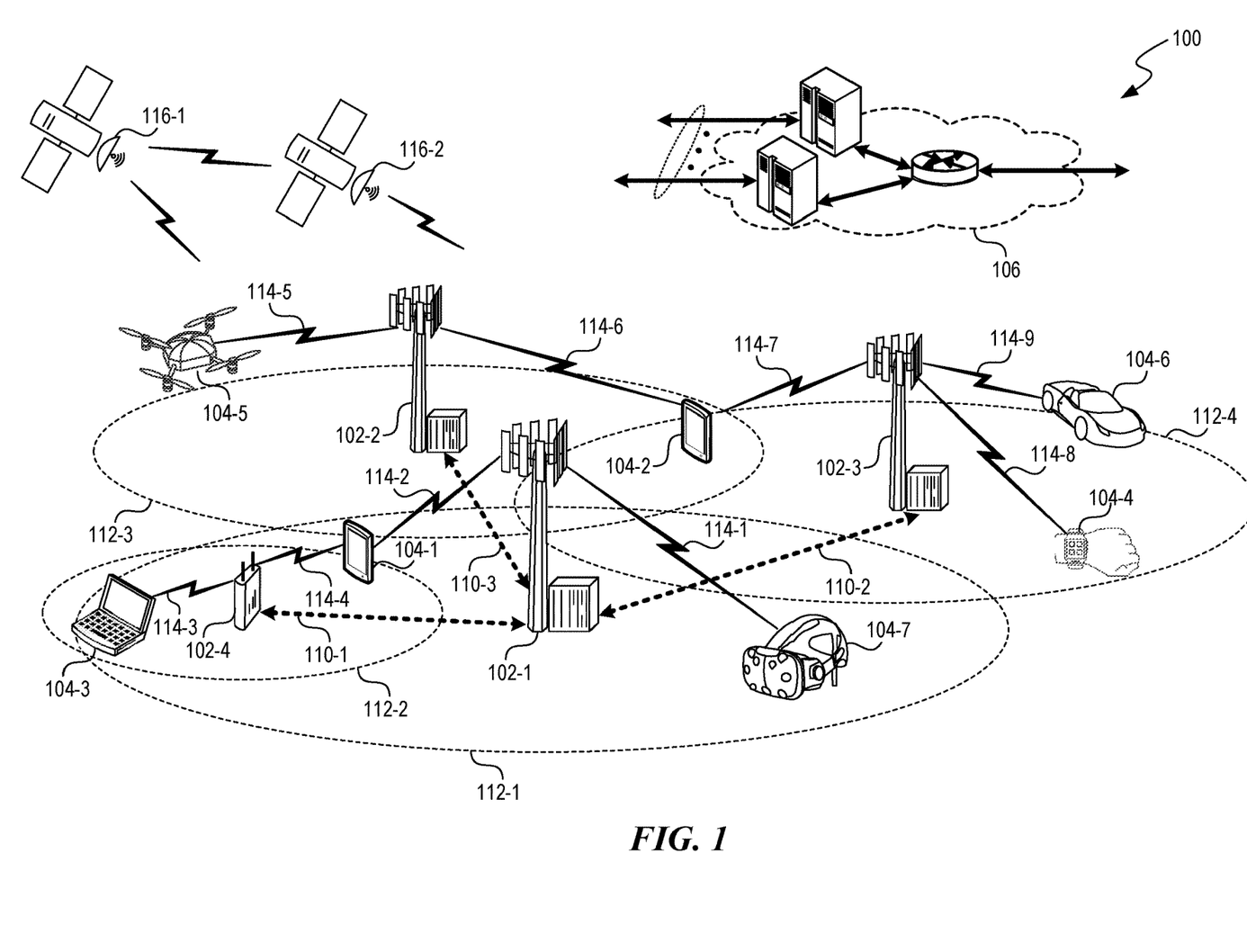
FIG. 1 is a block diagram that illustrates an example wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
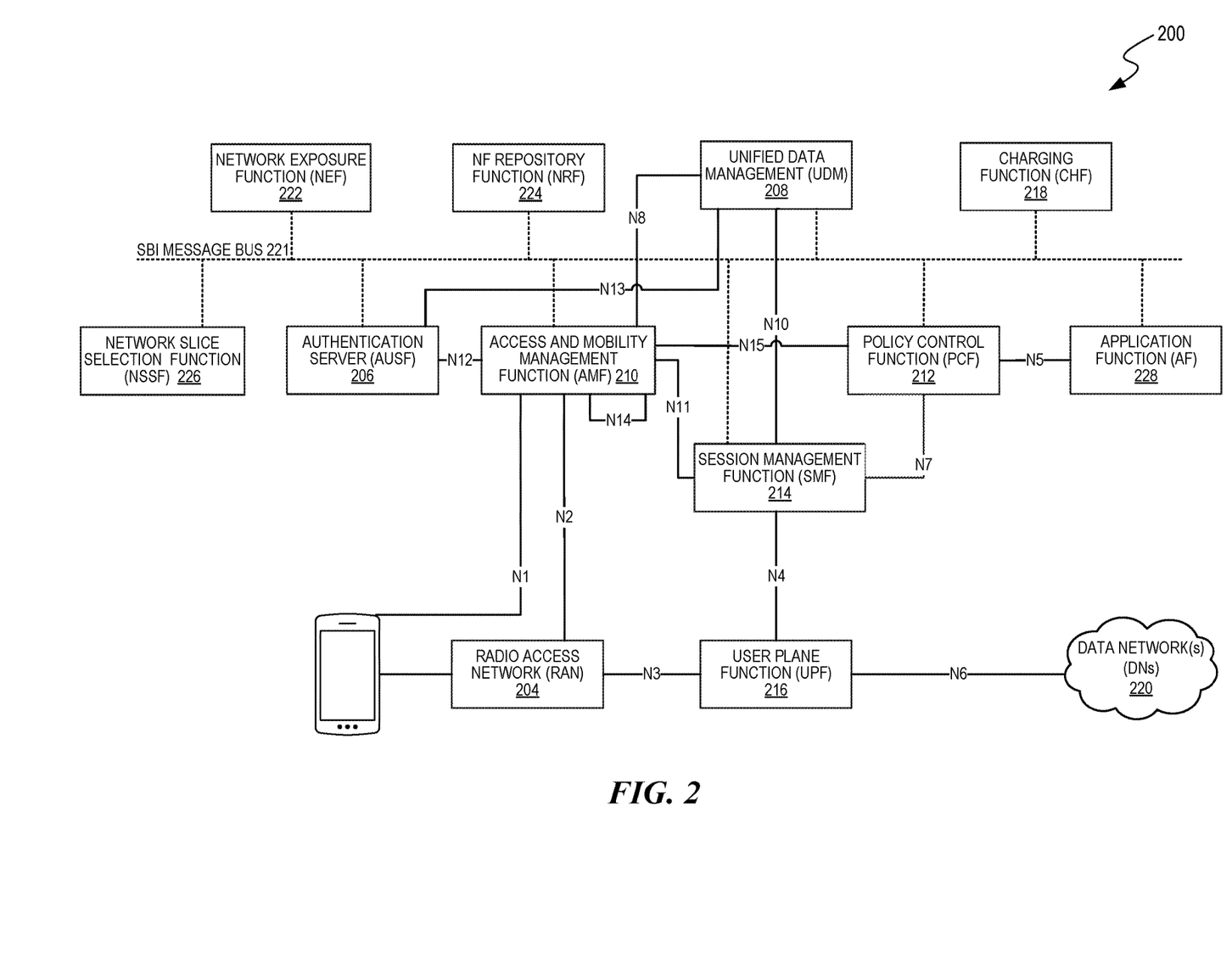
FIG. 2 is a block diagram that illustrates an example architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them.

The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Secure Tunnel-as-a-Service for 5G Networks

Figure 3:
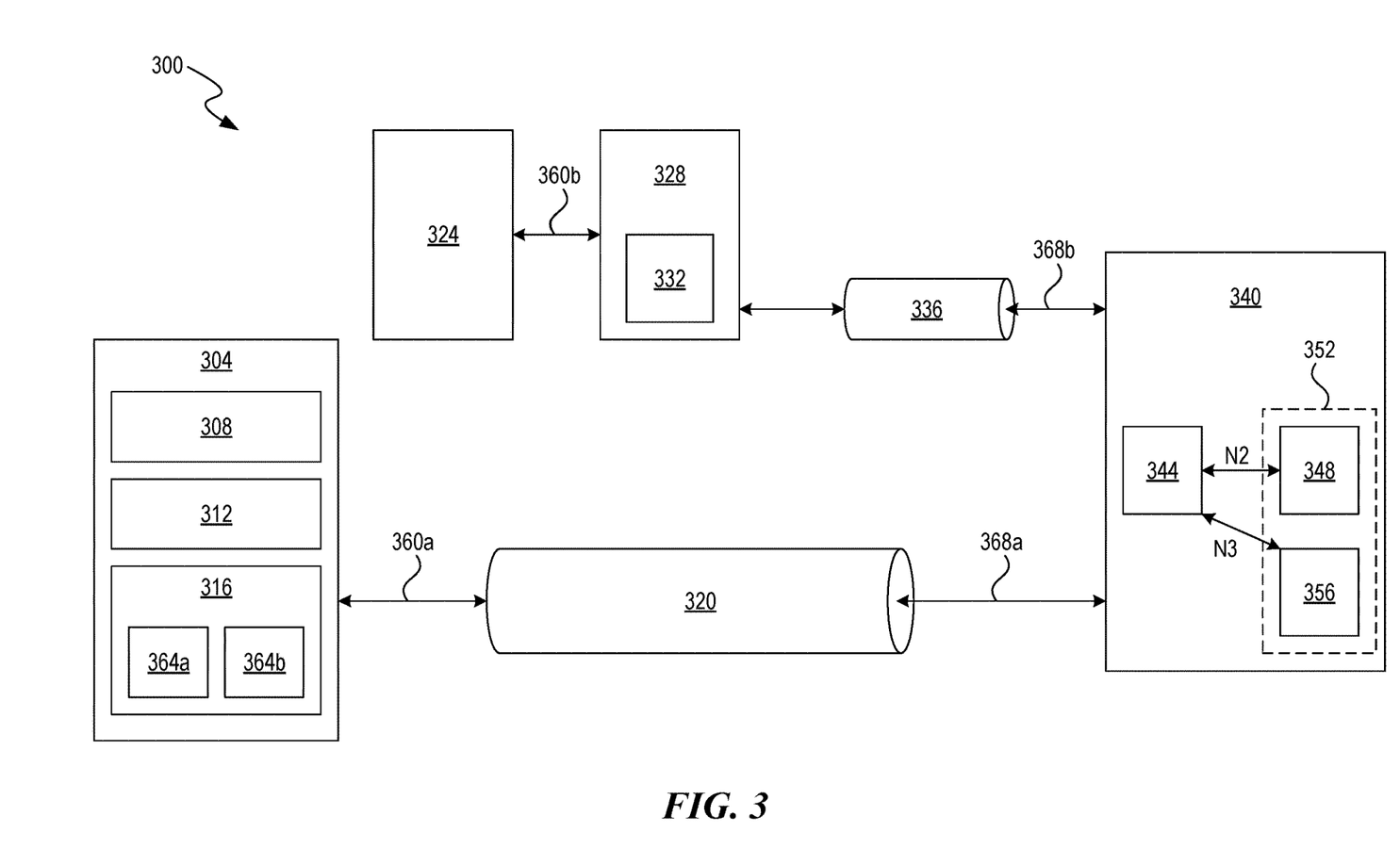
FIG. 3 is a block diagram that illustrates an example system for implementing a universal 3GPP-based secure tunnel-as-a-service for 5G networks.

FIG. 3 is a block diagram that illustrates an example system 300 for implementing a universal 3GPP-based secure tunnel-as-a-service for 5G networks. The system shown by FIG. 3 includes devices 304, 324, system 328, and 5G network 340. System 328 can be a cloud server, a gateway, a network node, or any other system that devices 304, 324 can connect to. 5G network 340 is implemented using components of network 100 and architecture 200 illustrated and described in more detail with reference to FIGS. 1-2. System 300 is implemented using components of the example computer system 500 illustrated and described in more detail with reference to FIG. 5. Likewise, implementations of system 300 can include different and/or additional components or can be connected in different ways.

Devices 304, 324 can be computers, smartphones, vehicles, sensors, robots, or other data appliances having wireless and/or wireline communication circuitry. For example device 304 or device 324 can be similar to or the same as wireless device 104 illustrated and described in more detail with reference to FIG. 1.

5G network 340 delivers services to devices 304, 324, for example, Internet-access, machine communications, media-streaming, or other data communications products. Device 304 includes user applications 304, Internet Protocol (IP) applications 312, and connectivity stack 316. In some implementations, connectivity stack 316 includes user plane layer 364a or control plane layer 364b. Device 324 lacks a connectivity stack. System 328 is a network node or a gateway. System 328 includes connectivity stack 332, which is the same as or similar to connectivity stack 316.

5G network 340 includes non-3GPP Interworking Function (N3IWF) service 344. 5G network 340 further includes 5GCN 352. Example components of a 5GCN are illustrated and described in more detail with reference to FIG. 2. 5GCN 352 includes AMF 348 and UPF 356. N3IWF service 344 is connected to AMF 348 over the N2 control plane interface. The N2 control plane interface performs connection management, UE context and PDU session management, and UE mobility management. An example AMF 210 and example N2 control plane interface are illustrated and described in more detail with reference to FIG. 2. In some implementations, N3IWF service 344 is located at a first edge location, and device 304 is connected by N3IWF service 344 to an AMF microservice located at a second edge location. For example, an N3IWF micro-service at edge location 1 connects to an AMF microservice at edge location 1 for UE type 1. In another example, an N3IWF micro-service at edge location 1 connects to an AMF microservice at edge location 2 for UE type 2. In another example, an N3IWF microservice at edge location 2 connects to an AMF microservice at central location 1 for UE type 3.

N3IWF service 344 is connected to UPF 356 over the N3 user plane interface. The N3 user plane interface conveys user data from the secure communications tunnels 320, 336 to UPF 356 to create both low- and high-latency services. An example UPF 216 and example N3 user plane interface are illustrated and described in more detail with reference to FIG. 2.

Device 304 establishes secure tunnel 320 within non-3GPP network 360a to connect to 5GCN 352 via N3IWF service 344. Non-3GPP networks 360a, 360b include data communication links, such as IEEE 802.11 (Wi-Fi) that support N1 interfaces. In some implementations, non-3GPP networks 360a, 360b include at least one of a Wi-Fi network (e.g., a Wi-Fi local area network), a Bluetooth network, an Infrared network, a microwave network, radio frequency ID (RFID), or a Zigbee network. The N1 interface is a transparent interface UEs to AMF 210. The N1 interface is used to transfer UE information (related to connection, mobility and sessions) to AMF 210. In some implementations, non-3GPP networks 360a, 360b include a wireline network. A wireline network (sometimes referred to as "broadband") uses cables or data lines to connect a service to a device. A wireline network provides an efficient connection for a variety of voice over IP (VOIP) services and high definition (HD) audio streams.

In some implementations, device 304 establishes secure tunnel 320 responsive to device 304 transitioning from a sleep mode to a wake mode. For example, the sleep mode (sometimes referred to as "suspend to RAM") is a low-power mode that reduces power consumption. Upon transitioning from the sleep mode to the wake mode, device 304 automatically connects to 5GCN 352 using the implementations described herein. In another example, device 304 is in a "suspend to Disk" mode. Upon transitioning from the sleep mode to the wake mode, device 304 is restored to its state prior to the sleep mode, and automatically connects to 5GCN 352 using the implementations described herein. In some implementations, device 304 establishes secure tunnel 320 responsive to device 304 powering on. The powering on can be performed to reinitialize device 304's set of configuration parameters, recover from an unresponsive state of its mission-critical functionality (e.g., in a crash or hang situation), or to reset network activity by connectivity stack 316.

In some implementations, device 304 lacks subscriber identity module (SIM) capability and eSIM capability. For example, device 304 can be an Internet of things (IOT) device or other similar device that does not have a SIM or eSIM capabilities. Device 304 (e.g., an IoT device) can include hardware, such as sensors, actuators, gadgets, appliances, or machines, that are programmed for certain applications and can transmit data over the Internet or other networks (e.g., non-3GPP networks 360a, 360b). The IoT device can be embedded into a mobile device, industrial equipment, an environmental sensor, a medical device, etc. The implementations described herein enable devices that lack SIM and eSIM capability to receive 5G network services. In other implementations, device 304 has SIM capability or eSIM capability but can, using the implementations described here, to connect to 5GCN 352 while obviating/circumventing use of its SIM capability or eSIM capability. N3IWF service 344 is a termination point for non-3GPP networks 360a, 360b at 5G network 340. For example, secure tunnels 320, 336 are terminated by N3IWF service 344.

Non-3GPP network 360a connects to 5GCN 352 via backhaul network 368a. Similarly, non-3GPP network 360b connects to 5GCN 352 via backhaul network 368b. In some implementations, a backhaul network (e.g., backhaul network 368a) lacks a radio access network (RAN). A RAN is a part of a mobile network that connects end-user devices (e.g., smartphones) to the cloud. Information is sent via radio waves from end-user devices to a RAN's transceivers, and finally from the transceivers to 5GCN 352. In other implementations, backhaul network 368a includes a RAN, which is disabled or experiencing downtime. The implementations disclosed herein connect devices 304, 324 to 5GCN 352 while obviating use of a RAN.

Connectivity stack 316 configures device 304 to establish secure tunnel 320. Connectivity stack 316 (sometimes referred to as a protocol stack or a network stack) is a software implementation of a computer networking protocol suite or protocol family installed on device 304. Similarly, connectivity stack 332 is a software implementation of a computer networking protocol suite or protocol family installed on system 328. To send data packets to 5GCN 352 and receive network services, device 304 sends a registration request to 5GCN 352 via the established secure tunnel 320. Device registration on 5GCN 352 enables device 304 to flag itself to 5GCN 352 as a "safe" or "authorized" device. In some implementations, device 304 performs a security handshake with 5GCN 352 via N3IWF service 344. For example, the security handshake includes an exchange of security parameters between device 304 and N3IWF service 344. In other implementations, device 304 only sends authentication credentials or parameters to N3IWF service 344 for registration.

Device 304 receives a message indicating that registration of device 304 with 5GCN 352 over non-3GPP network 360a is complete. Responsive to receiving the message, device 304 sends one or more first data packets to 5GCN 352 via secure tunnel 320. Device 304 receives one or more second data packets from 5GCN 352 via secure tunnel 320. For example, device 304 connects to a virtual mesh private network service using secure tunnel 320. In another example, device 304 connects to an edge computing service using secure tunnel 320. In some implementations, the one or more first data packets and the one or more second data packets are encrypted using transport layer security (TLS). TLS typically encrypts data sent over the Internet to ensure that eavesdroppers and hackers are unable to read transmissions of private and sensitive information, such as passwords, credit card numbers, or personal correspondence. N3IWF service 344 therefore provides a secure tunnel-as-a-service to devices 304, 324.

In some implementations, device 304 has established a first secure tunnel (e.g., secure tunnel 320) on a first non-3GPP network (e.g., non-3GPP network 360a). Device 304 detects that it has disconnected from non-3GPP network 360a, and connected to a second non-3GPP network (e.g., non-3GPP network 360b) that is different from the first non-3GPP network 360a. Responsive to detecting that device 304 is connected to second non-3GPP network 360b, device 304 establishes a second secure tunnel (e.g., secure tunnel 336) using second non-3GPP network 360b to connect to 5GCN 352 via N3IWF service 344.

In some implementations, system 328 (e.g., a gateway, a cloud server, or a network node) connects to device 324 via non-3GPP network 360b. System 328 establishes secure tunnel 336 to 5GCN 352 via N3IWF service 352. In an example system 328 establishes secure tunnel 336 responsive to detecting that device 324 has transitioned from a sleep mode to a wake mode, device 324 has been restarted, or device 324 has been powered on. In another example, system 328 establishes secure tunnel 336 responsive to receiving instructions or a message from device 324 seeking to establish a secure connection to 5GCN 352. System 328 includes connectivity stack 332 that configures system 328 to establish secure tunnel 336. Connectivity stack 332 can include control plane layer or a user plane layer.

System 328 can send a registration request for device 304 to 5GCN 352 via secure tunnel 336. In an example, device 304 sends the registration request via system 328. System 328 can perform a security handshake with 5GCN 352 via N3IWF service 344. Device 304 performs the security handshake in an example. System 328 receives a message indicating that registration of device 304 with 5GCN 352 over secure tunnel 336 is complete. System 328 can pass the message on the device 324. In some implementations, a security handshake is not performed but device 324 or system 328 sends security parameters or credentials to N3IWF service 344 for registering device 324.

System 328 or device 324 can access a security service via secure tunnel 336 to prevent distributed denial-of-service (DDOS) attacks. A DDOS attack is a malicious attempt to disrupt the normal traffic of a targeted server, service or network by overwhelming the target or its surrounding infrastructure with a flood of Internet traffic. In some implementations, data packets transmitted between devices 304, 324 and 5GCN 352 within secure tunnels 320, 336 are encrypted using Internet protocol security (IP Sec). IPSec refers to a group of protocols that are used together to set up encrypted connections between devices. IPSec keeps data sent over public networks secure. IPsec is often used to set up VPNs, and it works by encrypting IP packets, along with authenticating the source where the packets come from.

A security handshake between devices 304, 324 and N3IWF service 344 can be performed using a distributed ledger using a self-sovereign identity (SSI) paradigm. The SSI paradigm relates to methods for issuing, managing, and verifying identities of devices or users, and/or methods for how these entities authenticate themselves. The SSI paradigm refers to an approach to digital identity that enables devices 304, 324 or users control over the information they use to prove who they are to networks, websites, services, or applications. Devices or individuals having persistent accounts (identities) across the Internet, rely on a number of large identity providers that have control of the information associated with their identity. In an SSI system, the device/user exists independently from services, which enables them to access services in a streamlined and secure manner while maintaining control over the information associated with their identity. For example, the distributed ledger 504 and blockchain technology illustrated and described in more detail with reference to FIG. 5 enables a decentralized identity paradigm. Instead of an account-based identity model, a distributed ledger is used to identify devices/users by direct, private, peer-to-peer connections secured by public/private key cryptography. For example, the distributed ledger provides authentication of devices 304, 324 using an SSI paradigm and stored security parameters or credentials.

Figure 4:
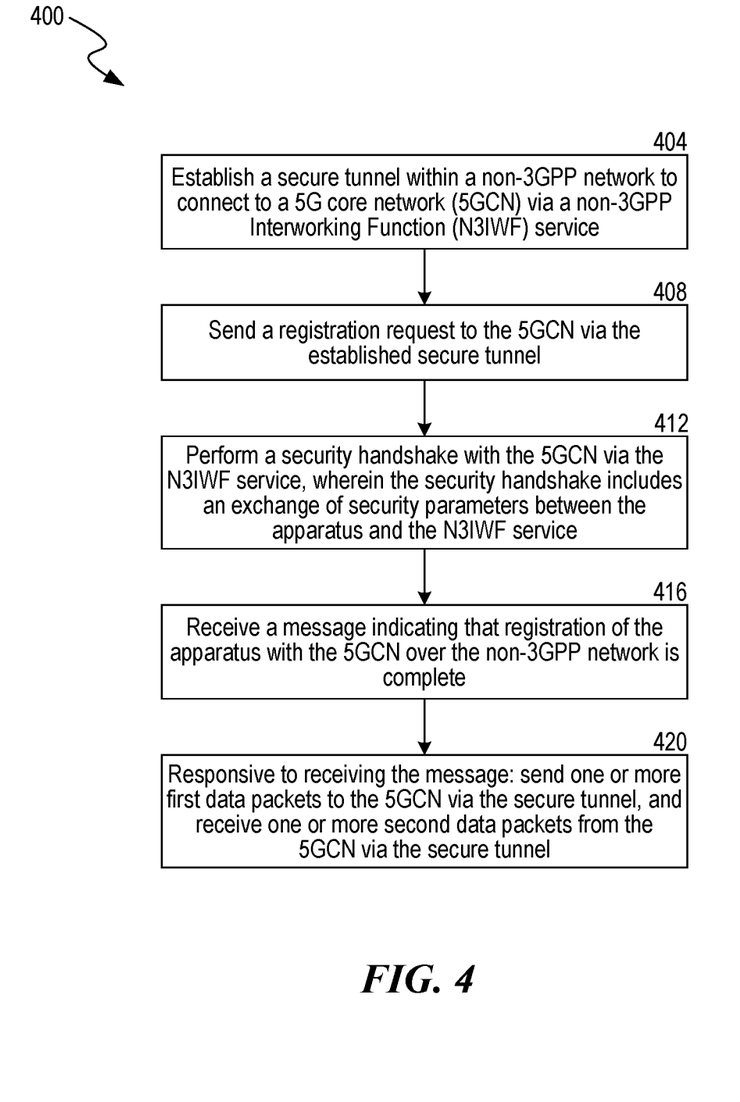
FIG. 4 is a flowchart that illustrates an example process for implementing a universal 3GPP-based secure tunnel-as-a-service for 5G networks.

FIG. 4 is a flowchart that illustrates an example process 400 for implementing a universal 3GPP-based secure tunnel-as-a-service for 5G networks. In some implementations, process 400 shown by FIG. 4 is performed by device 304. Process 400 can be performed by a computer system, e.g., the example computer system 600 illustrated and described in more detail with reference to FIG. 6. Particular entities, for example, system 328 or distributed ledger 500, perform some or all of the steps of process 400 in other implementations. Device 304 and system 328 are illustrated and described in more detail with reference to FIG. 3. Distributed ledger 500 is illustrated and described in more detail with reference to FIG. 5. Likewise, implementations can include different and/or additional steps or can perform the steps in different orders.

At operation 404, a device (e.g., device 304) establishes a secure tunnel within a non-3GPP network to connect to a 5GCN via an N3IWF service. For example, the device is an IoT device. Example secure tunnels 320, 336, example non-3GPP networks 360a, 360b, an example N3IWF service 344, and an example 5GCN 352 are illustrated and described in more detail with reference to FIG. 3. Components of an example 5GCN are illustrated and described in more detail with reference to FIGS. 1-2.

The N3IWF service functions similar to a gateway for the 5GCN with support for the N2 and N3 interfaces towards the 5GCN. The N3IWF service can be located at a first edge location, and the device is connected by the N3IWF service to an AMF microservice located at a second edge location. An example AMF 210 is illustrated and described in more detail with reference to FIG. 2.

In some implementations, the device lacks SIM capability and eSIM capability. In other implementations, the device has SIM capability or eSIM capability but is enabled, using the connectivity stack described here, to connect to the 5GCN while obviating use of its SIM capability or eSIM capability. The non-3GPP network can include a Wi-Fi network, a Bluetooth network, an Infrared network, a microwave network, RFID, or a Zigbee network. The device can connect to a virtual mesh private network service or an edge computing service using the secure tunnel.

A virtual mesh private network is an example of a service that the device can connect to using the secure tunnel. User devices can similarly use the secure tunnel-as-a-service to connect to and use other network offerings. In an example, a user device accesses an intelligent/smart residential and/or commercial automation service via the secure tunnel. The service can enable control of energy use while automating temperature adjustment, turning on and off lights, opening and closing window treatments, or adjusting irrigation based on the weather.

Edge computing services can also be accessed via the secure tunnel. For example, a mobile service provider's 5G+Edge Compute offering can be accessed via the secure tunnel. Such a service can bundle the mobile service provider's or its partners' cloud security solutions to accommodate a customer's secure access service edge (SASE) initiatives. SASE refers to a network architecture that combines virtual private network (VPN) and software-defined wide-area network (SD-WAN) capabilities with cloud-native security functions, such as secure web gateways, cloud access security brokers, firewalls, and zero-trust network access. The functions are delivered from the cloud and provided as a service by an SASE vendor. The secure tunnel therefore not only secures a customer's workloads, but also secures the applications or IP space from (D)DOS attacks, etc.

In another example, the secure tunnel is used to provide Smart X services (where X refers to a town, city, restricted area, etc.). The Smart X services can include traffic monitoring and management, adjustment of tolls, etc. The secure tunnel can also be used for device management and operations (e.g., software and firmware updates). For example, updates via the secure tunnel can upgrade a device with advanced operational instructions without needing any upgradation in the hardware. By updating the software or firmware securely, a user can explore new features that are added to the device and benefit from an enhanced user experience while interacting with the device.

The non-3GPP network can connect to the 5GCN using a backhaul network that lacks a RAN. In some implementations, the device includes a connectivity stack that configures the device to establish the secure tunnel. For example, the connectivity stack includes a control plane layer or a user plane layer. In other implementations, the device connects to a gateway or network node via the non-3GPP network. The gateway or network node includes a connectivity stack that configures the gateway or network node to establish a secure tunnel within the non-3GPP network to the 5GCN.

At operation 408, the device sends a registration request to the 5GCN via the established secure tunnel. Device registration on the 5GCN enables the device to flag itself to the 5GCN as a "safe" or "authorized" device. At operation 412, the device performs a security handshake with the 5GCN via the N3IWF service. The security handshake includes an exchange of security parameters between the device and the N3IWF service. For example, the security parameters are associated with extensible authentication protocol (EAP) data or 5G authentication and key agreement (5G AKA) data. The N3IWF service processes the EAP data and responsively authenticates and registers the device over a non-3GPP access node. The N3IWF service notifies the AMF of the authentication. The device registers with the 5GCN AMF over the N2 interface that traverses the non-3GPP access node and the N3IWF service. The AMF 422 interacts with other network functions to authorize the device for network services. For example, the AMF 422 queries a PCF to retrieve subscription information for the device to it. An example PCF 212 is illustrated and described in more detail with reference to FIG. 2.

At operation 416, the device receives a message indicating that registration of the device with the 5GCN over the non-3GPP network is complete. The device and the N3IWF service can advantageously establish multiple N1 signaling links over a single non-3GPP link. The non-3GPP links (networks) use electromagnetic frequencies in the low-band, mid-band, high-band, or some other portion of the electromagnetic spectrum. The communication links that support these technologies use metallic links, glass fibers, radio channels, or some other communication media. For example, the communication links use ENET, Time Division Multiplex (TDM), Data Over Cable System Interface Specification (DOCSIS), IP, General Packet Radio Service Transfer Protocol (GTP), Wi-Fi, virtual switching, inter-processor communication, bus interfaces, and/or some other data communication protocols.

At operation 420, in response to receiving the message, the device sends one or more first data packets to the 5GCN via the secure tunnel, and receives one or more second data packets from the 5GCN via the secure tunnel. The one or more first data packets and the one or more second data packets can be encrypted using TLS or IPSec. In some implementations, the N3IWF service forgoes authenticating the device, and instead transfers the EAP data to the AMF. The AMF interacts with an Authentication Server Function (AUSF) to authenticate the device based on the received EAP data. The AUSF uses the EAP data to authenticate the device. The AUSF indicates the authentication of the device to the AMF.

Figure 5:
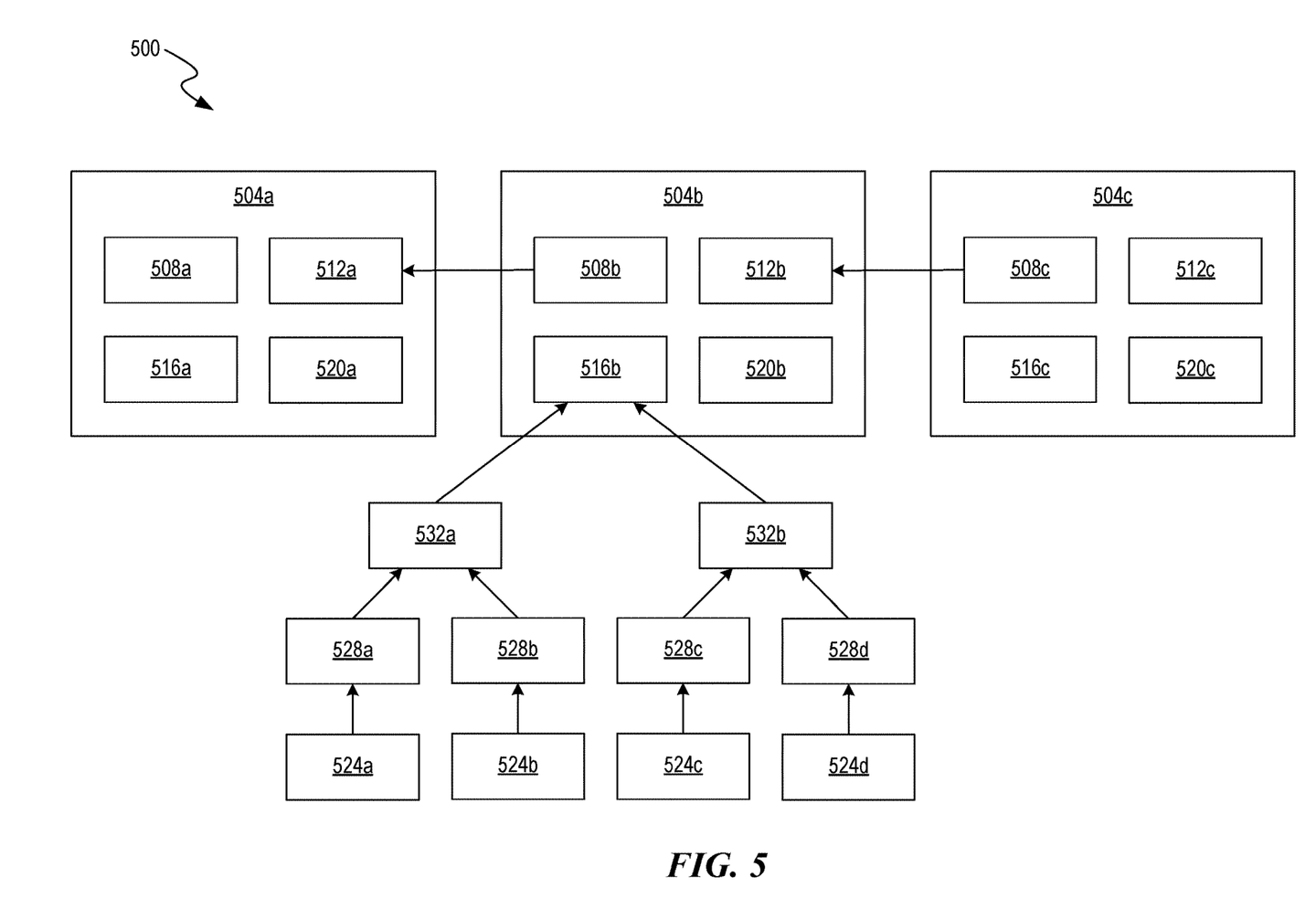
FIG. 5 is a block diagram that illustrates an example distributed ledger using a self-sovereign identity (SSI) paradigm for implementing a universal 3GPP-based secure tunnel-as-a-service for 5G networks.

FIG. 5 is a block diagram that illustrates an example distributed ledger 504 using a self-sovereign identity (SSI) paradigm for implementing a universal 3GPP-based secure tunnel-as-a-service for 5G networks. Decentralized identifiers (DIDs) are an implementation of the SSI paradigm. A DID is a globally unique identifier that enables an entity to be identified in a manner that is verifiable, persistent (as long as the DID controller desires), and does not require the use of a centralized registry. DIDs enable the SSI model of decentralized digital identity that is also sometimes referred to as a "decentralized identity paradigm." DIDs can be used in decentralized web applications. Other implementations of the SSI paradigm are also used in different applications. For example, an identifier in the SSI paradigm can resolve to a document describing an entity using cryptographic public keys that the entity can use to authenticate itself.

System 500 includes distributed ledger 504 (sometimes referred to as a "blockchain"). In some implementations, blockchain 504 is a distributed ledger of security parameters, identity information or credentials, or transactions (e.g., a continuously growing list of records, such as security handshakes, exchange of security parameters between devices and an N3IWF service, or records of transactions for digital assets) that is maintained by system 500. For example, blockchain 504 is stored redundantly at multiple nodes (e.g., computers) of a blockchain network. Each node in the blockchain network can store a complete replica of the entirety of blockchain 504. In some implementations, system 500 implements storage of an identical blockchain at each node, even when nodes receive transactions in different orderings. Blockchain 504 shown by FIG. 5 includes blocks such as block 504a, block 504b, and/or block 504c. Likewise, embodiments of the system 500 can include different and/or additional components or be connected in different ways.

The terms "blockchain" and "chain" are used interchangeably herein. Blockchain 504 is a distributed database that is shared among the nodes of a computer network. Blockchain 504 can maintain a secure and decentralized record of access attempts to a 5G network by a user device (e.g., transaction 524a-b). Blockchain 504 provides fidelity and security for the data record. Blockchain 504 can collect information together in groups, known as "blocks" (e.g., blocks such as block 504a, block 504b, and/or block 504c) that hold sets of information.

Blockchain 504 structures its data (e.g., user credentials) into chunks (blocks) (e.g., blocks such as block 504a, block 504b, and/or block 504c) that are strung together. Blocks (e.g., block 504c) have certain storage capacities and, when filled, are closed and linked to a previously filled block (e.g., block 504b), forming a chain of data known as the "blockchain." New information that follows a freshly added block (e.g., block 504b) is compiled into a newly formed block (e.g., block 504c) that will then also be added to blockchain 504 once filled. The data structure inherently makes an irreversible timeline of data when implemented in a decentralized nature. Each block (e.g., block 504a) in system 500 is given an exact timestamp (e.g., timestamp 512a) when it is added to system 500. In the example of FIG. 5, system 500 includes multiple blocks. Each of the blocks (e.g., block 504a, block 504b, block 504c) can represent one or multiple security handshakes performed and can include a cryptographic hash of the previous block (e.g., previous hashes 508a-c), a timestamp (e.g., timestamps 512a-c), a transactions root hash (e.g., 516*a-c*), and a nonce (e.g., 520*a-c*). A transactions root hash (e.g., transactions root hash 516*b*) indicates the proof that block 504*b* contains all the transactions in the proper order. Transactions root hash 516*b* proves the integrity of transactions in the block 504*b* without presenting all transactions.

Timestamp 512*a-c* of each of corresponding blocks of block 504*a*, block 504*b*, block 504*c* can include data indicating a time associated with an attempt to access a network. In some examples, the timestamp includes a sequence of characters that uniquely identifies a given point in time. In one example, the timestamp of a block includes the previous timestamp in its hash and enables the sequence of block generation to be verified.

As described above, each of block 504*a*, block 504*b*, block 504*c* of blockchain 504 can include a respective block hash, e.g., transactions root hash 516*a*, transactions root hash 516*b*, and transactions root hash 516*c*. In the example of FIG. 5, block 504*b* records transactions 524*a-d* (e.g., access attempts at a 5G network). Each of the leaf nodes 528*a-d* contain a hash corresponding to transactions 524*a-d* respectively. As described above, a hash (e.g., the hash in leaf node such as node 528*a*) can be a hash of components of a transaction (e.g., transaction 524*a*), for example, a reference that identifies an output of a prior transaction that is input to the transaction 524*a*, security parameters, identity information, or credentials.

A Merkle tree representation of an access attempt (e.g., transaction 524*a*) allows an entity needing access to a network to be provided with only a portion that includes the components that the entity needs. For example, if an entity needs only the transaction summary, the entity can be provided with the nodes (and each node's sibling nodes) along the path from the root node to the node of the hash of the transaction summary. Because only the portion of the Merkle tree relating to components that an entity (e.g., devices 304, 324) needs is provided, the entity will not have access to other components. Thus, the confidentiality of other user devices that store credentials on the blockchain is not compromised.

Computer System

Figure 6:
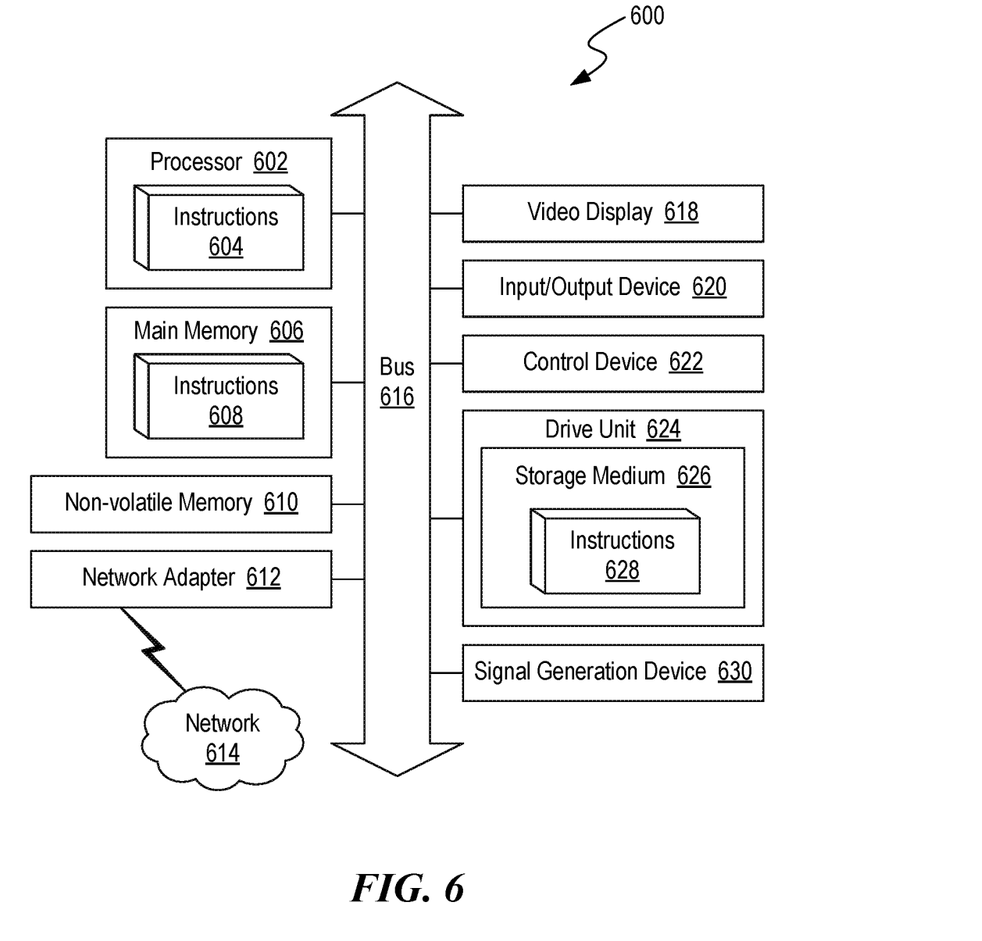
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having alternative steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. An apparatus comprising:
   at least one hardware processor; and
   at least one non-transitory memory storing instructions, which, when executed by the at least one hardware processor, cause the apparatus to:
     establish a secure tunnel within a non-third generation partnership project (non-3GPP) network to connect to a 5G core network (5GCN) via a non-3GPP Interworking Function (N3IWF) service of the 5GCN,
       wherein the apparatus lacks subscriber identity module (SIM) capability and eSIM capability,
       wherein the non-3GPP network connects to the 5GCN using a backhaul network that lacks a radio access network (RAN),
       wherein the apparatus includes a connectivity stack that configures the apparatus to establish the secure tunnel, and
       wherein the connectivity stack includes a control plane layer and a user plane layer;
     send a registration request to the 5GCN via the established secure tunnel;
     perform a security handshake with the 5GCN via the N3IWF service by performing steps to:
       receive extensible authentication protocol (EAP) data from the N3IWF service;
       receive, from a device associated with a distributed ledger, a portion of the distributed ledger that includes blocks that represent previous security handshakes,
         wherein the blocks of the distributed ledger include timestamps indicating times for network access attempts associated with the previous security handshakes, and
         wherein a particular block of the distributed ledger includes a particular transactions root hash indicating proof that the particular block includes a particular set of 5G network access attempts in a particular order;

authenticate the apparatus using the EAP data and using a self-sovereign identity (SSI) paradigm associated with the distributed ledger;

receive authorization for network services based on subscription information;

receive a message indicating that registration of the apparatus with the 5GCN over the non-3GPP network is complete; and responsive to receiving the message:
  send one or more first data packets to the 5GCN via the secure tunnel; and
  receive one or more second data packets from the 5GCN via the secure tunnel.

2. The apparatus of claim 1, wherein the non-3GPP network comprises at least one of:
  a Wi-Fi network, a Bluetooth network, an Infrared network, a microwave network, radio frequency ID (RFID), or a Zigbee network.

3. The apparatus of claim 1, wherein the one or more first data packets and the one or more second data packets are encrypted using transport layer security (TLS).

4. The apparatus of claim 1, wherein the N3IWF service is located at a first edge location, and
  wherein the apparatus is connected by the N3IWF service to an access and mobility management function (AMF) microservice located at a second edge location.

5. The apparatus of claim 1, wherein the instructions cause the apparatus to:
  connect to a virtual mesh private network service using the secure tunnel.

6. The apparatus of claim 1, wherein the instructions cause the apparatus to:
  connect to an edge computing service using the secure tunnel.

7. The apparatus of claim 1, wherein the apparatus is an Internet of things (IoT) device.

8. At least one non-transitory computer-readable storage medium storing instructions, which, when executed by at least one data processor of a system, cause the system to:
  establish a secure tunnel within a non-third generation partnership project (non-3GPP) network to connect to a 5G core network (5GCN) via a non-3GPP Interworking Function (N3IWF) service,
    wherein the system includes a connectivity stack that configures the system to establish the secure tunnel;
  send a registration request to the 5GCN via the secure tunnel;
  perform a security handshake with the 5GCN via the N3IWF service by performing steps to:
    receive extensible authentication protocol (EAP) data from the N3IWF service;
    receive, from a device associated with a distributed ledger, a portion of the distributed ledger that includes blocks that represent previous security handshakes,
      wherein the blocks of the distributed ledger include timestamps indicating times for network access attempts associated with the previous security handshakes, and
      wherein a particular block of the distributed ledger includes a particular transactions root hash indicating proof that the particular block includes a particular set of network access attempts in a particular order;
  authenticate the system using the EAP data and using an SSI paradigm associated with the distributed ledger; and
  receive authorization for network services based on subscription information;
  receive a message indicating that registration of the system with the 5GCN over the non-3GPP network is complete; and
  responsive to receiving the message,
    send one or more data packets to the 5GCN via the secure tunnel.

9. The non-transitory computer-readable storage medium of claim 8, wherein the instructions cause the system to:
  establish the secure tunnel responsive to the system transitioning from a sleep mode to a wake mode.

10. The non-transitory computer-readable storage medium of claim 8, wherein the instructions cause the system to:
  establish the secure tunnel responsive to the system powering on.

11. The non-transitory computer-readable storage medium of claim 8, wherein the secure tunnel is terminated by the N3IWF service.

12. The non-transitory computer-readable storage medium of claim 8, wherein the secure tunnel is a first secure tunnel,
  wherein the non-3GPP network is a first non-3GPP network, and
  wherein the instructions cause the system to:
    detect that the system has connected to a second non-3GPP network that is different from the first non-3GPP network; and
    responsive to detecting that the system has connected to the second non-3GPP network, establish a second secure tunnel using the second non-3GPP network to connect to the 5GCN via the N3IWF service.

13. The non-transitory computer-readable storage medium of claim 8, wherein the system lacks subscriber identity module (SIM) capability and eSIM capability.

14. The non-transitory computer-readable storage medium of claim 8, wherein the system has SIM capability or eSIM capability.

15. At least one non-transitory computer-readable storage medium storing instructions, which, when executed by at least one data processor of a system, cause the system to:
  connect to an apparatus via a non-3GPP network;
  establish a secure tunnel to a 5G core network (5GCN) via a non-third generation partnership project (non-3GPP) Interworking Function (N3IWF) service,
    wherein the system includes a connectivity stack that configures the system to establish the secure tunnel, and
    wherein the connectivity stack includes at least one of a control plane layer or a user plane layer;
  send a registration request for the apparatus to the 5GCN via the secure tunnel;
  perform a security handshake with the 5GCN via the N3IWF service by performing steps to:
    receive extensible authentication protocol (EAP) data from the N3IWF service;
    receive, from a device associated with a distributed ledger, a portion of the distributed ledger that includes blocks that represent previous security handshakes, wherein the blocks of the distributed ledger include timestamps indicating times for network access attempts associated with the previous security handshakes, and wherein a particular block of the distributed ledger includes a particular transactions root hash indicating proof that the particular block includes a particular set of network access attempts in a particular order;

authenticate the apparatus using the EAP data and using a self-sovereign identity (SSI) paradigm associated with the distributed ledger; and receive authorization for network services based on subscription information; and receive a message indicating that registration of the apparatus with the 5GCN over the secure tunnel is complete.

16. The non-transitory computer-readable storage medium of claim 15, wherein the instructions cause the system to:

access a security service via the secure tunnel to prevent distributed denial-of-service (DDOS) attacks.

17. The non-transitory computer-readable storage medium of claim 15, wherein data packets transmitted between the system and the 5GCN within the secure tunnel are encrypted using Internet protocol security (IPSec).

18. The non-transitory computer-readable storage medium of claim 15, wherein the apparatus lacks subscriber identity module (SIM) capability and eSIM capability.

19. The non-transitory computer-readable storage medium of claim 15, wherein the security handshake includes an exchange of security parameters between the system and the N3IWF service.

* * * * *